(12) United States Patent  (10) Patent No.: US 9,969,314 B2
Jones  (45) Date of Patent: May 15, 2018

(54) CONTAINER LOADING AND UNLOADING SYSTEM

(71) Applicant: Sean Jones, The Plains, OH (US)

(72) Inventor: Sean Jones, The Plains, OH (US)

( * ) Notice: Subject to any disclaimer, the term of this patent is extended or adjusted under 35 U.S.C. 154(b) by 0 days. days.

(21) Appl. No.: 14/471,641

(22) Filed: Aug. 28, 2014

(65) Prior Publication Data

US 2014/0369797 A1  Dec. 18, 2014

(51) Int. Cl.
*B60P 1/64* (2006.01)

(52) U.S. Cl.
CPC .......... *B60P 1/6454* (2013.01); *B60P 1/6427* (2013.01)

(58) Field of Classification Search
CPC ......... B60P 1/22; B60P 1/6427; B60P 1/6454; B60P 1/6463
USPC ................. 414/477–480, 491, 494
See application file for complete search history.

(56) References Cited

U.S. PATENT DOCUMENTS

| | | |
|---|---|---|
| 2,317,984 A | 5/1943 | Fitch |
| 3,214,046 A | 10/1965 | Dempster et al. |
| 3,272,546 A | 9/1966 | Cooley |
| 3,302,808 A | 2/1967 | Herpich et al. |
| 3,467,268 A | 9/1969 | Corompt |
| 3,526,331 A | 9/1970 | Marshall et al. |
| 3,578,185 A | 5/1971 | Black |
| 3,638,817 A | 2/1972 | Corompt |
| 3,841,505 A | 10/1974 | Kent |
| 3,899,205 A | 8/1975 | Lanigan et al. |
| 3,934,740 A | 1/1976 | Rumell |
| 3,957,166 A | 5/1976 | Durham |
| 3,964,626 A | 6/1976 | Arregui |
| 4,044,906 A | 8/1977 | Schrag et al. |
| 4,136,791 A | 1/1979 | Clark |
| 4,225,280 A | 9/1980 | Brunet et al. |
| 4,248,561 A | 2/1981 | Graves |
| 4,352,625 A | 10/1982 | Bolderoff |
| 4,595,210 A | 6/1986 | Groeing |
| 4,606,176 A | 8/1986 | Cundall |
| 4,632,626 A | 12/1986 | O-Shea |
| 4,679,979 A | 7/1987 | Rasmussen |

(Continued)

FOREIGN PATENT DOCUMENTS

| | | |
|---|---|---|
| CN | 2509022 Y | 9/2002 |
| EP | 0188280 | 7/1986 |
| WO | 2009013449 | 1/2009 |

*Primary Examiner* — James Keenan
(74) *Attorney, Agent, or Firm* — Jason H. Foster; Kremblas & Foster (57) ABSTRACT

An apparatus for loading shipping containers onto and off of a truck or trailer bed. The apparatus includes rotatably mounted drive chains disposed in a laterally-spaced relationship adjacent the lateral edges of the bed. The drive chains are driven by a hydraulic motor on the bed. Lift spikes are rigidly mounted the drive chains and extend perpendicularly therefrom for engaging and pulling a container onto the bed. Lift wedges are pivotably mounted to the rear edge of the bed and are rotatably driven by hydraulic rams for lifting the front edge of a container onto the lift spikes. Container locking assemblies are located adjacent the four corners of the bed and each include a locking pin positioned above the bed coupled to a pneumatic ram mounted to an underside of the bed. The hydraulic rams move the locking pins laterally, between a locked position and an unlocked position.

5 Claims, 7 Drawing Sheets

(56) References Cited

U.S. PATENT DOCUMENTS

| | | |
|---|---|---|
| 4,699,558 A | 10/1987 | Hagge et al. |
| 4,802,811 A | 2/1989 | Nijenhuis |
| 4,943,202 A | 7/1990 | Galloway |
| 5,007,791 A | 4/1991 | Boughton |
| 5,562,391 A | 10/1996 | Green |
| 5,567,109 A | 10/1996 | Eaton |
| 5,803,699 A | 9/1998 | Pinkston |
| 5,810,186 A | 9/1998 | Lam |
| 5,902,090 A | 5/1999 | Young et al. |
| 5,919,021 A | 7/1999 | Eiland |
| 6,328,520 B1 | 12/2001 | Maclay |
| 6,402,457 B1 | 6/2002 | Maeno |
| 6,568,892 B2 | 5/2003 | Landoll et al. |
| 6,655,904 B2 | 12/2003 | Landoll et al. |
| 6,764,274 B2 | 7/2004 | Maclay |
| 6,766,634 B2 | 7/2004 | Covington et al. |
| 6,857,840 B2 | 2/2005 | Simpson et al. |
| 6,997,663 B2 | 2/2006 | Siebenga |
| 7,112,030 B2 | 9/2006 | Renziehausen |
| 7,134,829 B2 | 11/2006 | Quenzi et al. |
| 8,029,228 B2 | 10/2011 | Marmur |
| 8,459,925 B2 | 6/2013 | Mullin et al. |
| 8,465,246 B2 * | 6/2013 | Duell ............... B60P 1/6463 414/480 |
| 2001/0008605 A1 | 7/2001 | Schultz |
| 2004/0151564 A1 | 8/2004 | Waguespack |
| 2007/0025832 A1 | 2/2007 | Rawson et al. |
| 2009/0324374 A1 * | 12/2009 | De Carli ............ B60P 1/6463 414/478 |
| 2010/0111655 A1 | 5/2010 | Weeks et al. |
| 2010/0272549 A1 | 10/2010 | Petty |
| 2011/0014022 A1 | 1/2011 | Shoemaker et al. |
| 2011/0202199 A1 | 8/2011 | Crame |

* cited by examiner

CONTAINER LOADING AND UNLOADING SYSTEM

CROSS-REFERENCES TO RELATED APPLICATIONS

This application is a continuation of U.S. application Ser. No. 13/314,317 filed Dec. 8, 2011, and which is incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present invention relates generally to the field of freight transport and more particularly to an apparatus and method for loading and unloading ISO shipping containers onto and off of truck and trailer beds.

International Standards Organization (ISO) sea shipping containers are used to store and transport freight all over the world. At shipping ports, specialized cranes are used to load and unload ISO containers onto and off of heavy semi-trucks and freight trains. Such cranes are typically very large and very expensive and are therefore generally not available to end users of ISO containers, such as individuals and companies who handle relatively small quantities of containers compared to shipping ports.

Traditionally, end users of ISO containers have used conventional truck cranes or winch-bed trucks and trailers to load and unload ISO containers for transport and storage. However, both of these options have significant disadvantages associated with them. For example, truck cranes are expensive, they consume a great deal of space on a truck bed, they can only be used on substantially flat ground, and they require skilled operators to use them. Moreover, loading and unloading ISO containers using truck cranes can be very dangerous, as such operations require ISO containers, which typically weigh several tons, to be lifted high into the air. This creates a drop/crush hazard for individuals in the vicinity of a container that is being loaded or unloaded. Winch-bed trucks and trailers are less expensive and are easier to use than truck cranes, but they require dragging a container onto a truck or trailer bed using cables and hooks. Such dragging can cause significant damage to both the container and to the surface along which the container is dragged. Moreover, loading and unloading containers using either truck cranes or winch-bed trucks and trailers is very time consuming and requires an operator to manually fasten a container to, or unfasten a container from, a truck bed or trailer.

In view of the foregoing, it would be advantageous to provide means for loading and unloading ISO shipping containers that is relatively inexpensive, fast, safe, easy to use, that does not require a skilled operator, and that does not cause damage to containers or to surfaces upon which containers rest. It would further be advantageous to provide such means that allows containers to be fastened and unfastened to and from truck and trailer beds quickly and automatically.

BRIEF SUMMARY OF THE INVENTION

In accordance with the present invention there is provided an apparatus for loading and unloading ISO shipping containers onto and off of the tilting bed of a truck or a trailer. The apparatus generally includes a pair of drive chains, a pair of lift wedges, and four container locking assemblies. The drive chains of the apparatus are disposed in a laterally-spaced relationship adjacent the lateral edges of the bed and are preferably driven by a hydraulic motor. Each drive chain is operatively mounted to a pair of sprockets that are rotatably mounted to opposing longitudinal ends of the bed. Elongated lift spikes are rigidly mounted to each of the drive chains and extend outwardly therefrom for engaging and pulling an ISO shipping container onto the bed when the drive chains are driven. The lift spikes are adapted to fit into the corner holes of an ISO shipping container.

The lift wedges are substantially triangular members that are pivotably mounted to the rear edge of the bed in a laterally-spaced relationship. The lift wedges can be pivoted about a common lateral axis between a "stowed" position, wherein the lift wedges extend substantially upwardly from the rear edge of the bed, and a "deployed" position, wherein the lift wedge extend substantially rearwardly from the rear edge of the bed. Hydraulic rams are mounted to the underside of the bed and engage the lift wedges for driving the wedges between the stowed and deployed positions. The lift wedges are thereby used to lift and pull the front end of a shipping container onto the bed above the lift spikes.

A pair of buffer wheels is preferably mounted to the rear edge of the bed, inward of the lift wedges. When the bed is deployed during operation of the apparatus the buffer wheels engage the surface upon which the truck and container sit and prevent the rear edge of the bed from scraping and potentially damaging the surface.

The container locking assemblies are located adjacent the four corners of the bed and each include a laterally inwardly-extending locking pin positioned above the bed coupled to a hydraulic ram that is preferably mounted to an underside of the bed. The hydraulic rams move the locking pins laterally between an inward, locked position and an outward, unlocked position, thereby engaging or disengaging the corner holes of a container that is loaded on the bed for locking or unlocking the container to or from the bed.

In the preferred embodiment of the invention, each of the above-described components of the invention is operatively connected to a master control, such as a microcontroller or a programmable logic controller, that is capable of automatically operating the components in a predetermined manner once initiated by a human operator. Thus, once the operator has properly positioned a truck in front of a container that is to be loaded, the operator can activate the master control unit, which will then automatically operate the bed, the lift wedges, the drive chains, and the locking assemblies to load and secure the container onto the bed without further input from the operator.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 1:
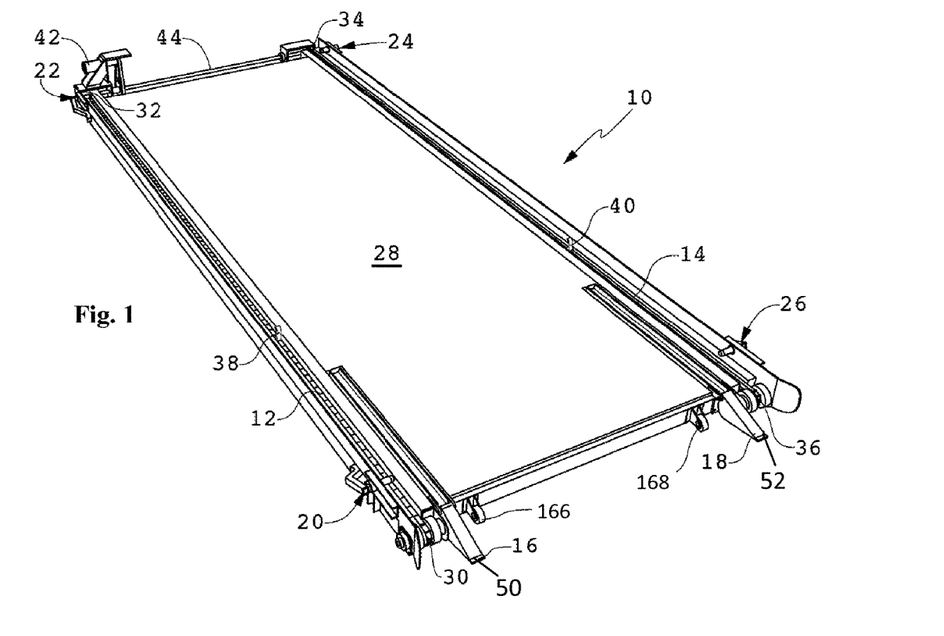
FIG. 1 is a perspective view illustrating the preferred embodiment of the present invention.

Referring to FIG. 1, an apparatus for loading and unloading ISO shipping containers onto and off of truck and trailer beds is indicated generally at 10. The apparatus 10 generally includes a pair of drive chains 12 and 14, a pair of lift wedges 16 and 18, and four container locking assemblies 20, 22, 24, and 26. As will be appreciated by those of ordinary skill in the art, and as will become apparent from the description below, the components of the apparatus 10 can be incorporated into a conventional tilting truck bed 28, as shown in FIGS. 7a-7d and 8a-8d, or into a conventional tilting trailer bed (not shown). The term "bed" is therefore defined herein to mean a truck bed or a trailer bed. It will also be appreciated that the apparatus can be used for loading conventional, 20 foot ISO shipping containers onto a standard, straight truck bed, or can be lengthened in a manner that will be readily apparent for loading conventional, 40 foot ISO shipping containers onto a standard, 40 foot trailer bed.

For the sake of convenience and clarity, terms such as "top," "bottom," "inward," "outward," "length," "width," "lateral," and "longitudinal" will be used herein to describe the relative size and orientation of various components of the apparatus 10, all with respect to the geometry and orientation of the apparatus 10 and bed 28 as they appear in FIG. 1. This terminology will include the words specifically mentioned, derivatives thereof, and words of similar import. Also for the sake of clarity, the bed is shown separate from the truck in FIG. 1.

Referring to FIG. 1, the drive chains 12 and 14 of the apparatus 10 are disposed in a laterally-spaced, longitudinally-extending relationship adjacent the lateral edges of the bed 28. The drive chains 12 and 14 are preferably spaced about 89 inches apart to match the on-center distance between the corner posts of an ISO shipping container. The drive chains 12 and 14 are preferably each formed of looped sections of conventional C2080 double pitch conveyor chain, although it is contemplated that various other flexible members can be substituted for the preferred conveyor chains, including, but not limited to, various cables, tracks, ropes, and other types of chains.

Each drive chain is operatively mounted to a pair of 2080B11 ext pitch sprockets 30, 32, 34, and 36 that are rotatably mounted at opposing longitudinal ends of the bed 28. It is contemplated that various other types of sprockets or pulleys can be substituted for the preferred sprockets 30-36, particularly if a different type of chain is used. The drive chains 12 and 14 and sprockets 30-36 are preferably recessed within longitudinally-elongated channels that are formed in the bed 28. The top surfaces of the drive chains 12 and 14 thereby sit flush or nearly flush with the top surface of the bed 28.

Referring to FIGS. 1 and 6a-6d, elongated lift spikes 38 and 40 are rigidly mounted to each of the drive chains 12 and 14 and extend substantially perpendicularly therefrom. The lift spikes 38 and 40 are preferably formed of steel and are welded to the drive chains 12 and 14, although it is contemplated that other high-strength materials and means of attachment can alternatively be employed. The lift spikes 38 and 40 are about 3 inches long and preferably have a forward bend or curve to form a claw-like shape, but this is not critical. It is important that the lift spikes 38 and 40 are of a size and shape that fit into the corner holes of an ISO shipping container in a manner that will be described in detail below. It is also important that the lift spikes 38 and 40 are mounted to their respective drive chains 12 and 14 in lateral alignment with one another and are therefore at the same longitudinal position along the bed 28 at any given time.

Referring to FIG. 1, a conventional hydraulic motor 42 is rigidly mounted to the bed 28 and is coupled to a drive shaft 44 through a conventional gear assembly. The drive shaft 44 operatively engages the forward pair of sprockets 30 and 34 (i.e. the sprockets nearest the truck cab) for driving the sprockets 30 and 34 and attached drive chains 12 and 14 and lift spikes 38 and 40 during operation of the apparatus 10. Particularly, the lift spikes 38 and 40 can be driven between an "unloaded" position at the rear of the bed 28 (shown in FIG. 6a) and a "loaded" position adjacent the front of the bed 28 (the lift spikes 38 and 40 are in the loaded position in FIG. 8d but are not visible). It is contemplated that the motor 42, the drive shaft 44, and the forward pair of sprockets 30 and 34 can be mounted atop an air cushion or another shock absorbing means, such as a block of rubber, for reducing vibration and mitigating the risk damage to the apparatus 10 during operation.

The hydraulic motor 42 is operatively coupled to a control mechanism (not shown) that is preferably located in the truck cab for allowing an operator to control the operation of the motor while seated in the cab. Alternatively, it is contemplated that the control mechanism can be located on the bed 28, integral with the motor 42, or on a remote control wirelessly or otherwise connected to the motor 42. It is further contemplated that an electric motor or other suitable drive means can be substituted for the hydraulic motor 42 without departing from the present invention.

Referring to FIGS. 1-4, the lift wedges 16 and 18 are preferably substantially triangular members having rounded front sides 46 and 48 and substantially planar lips 50 and 52 extending from their rear edges. It is contemplated that the shape of the lift wedges 16 and 18 can be varied somewhat without departing from the present invention. For example, the lift wedges 16 and 18 can alternatively have flat front sides (i.e. perpendicular with the bottom surfaces of the wedges) and the rear lips 50 and 52 can be omitted. The lift wedges 16 and 18 are pivotably mounted to the top, rear edge of the bed 28 in a laterally-spaced relationship, inward of the drive chains 12 and 14, by a pair of collinear pivot pins (not within view). The lift wedges 16 and 18 are spaced about 80 inches apart to correspond to the on-center distance between the recessed lift points of an ISO shipping container. The lift wedges 16 and 18 can be independently pivoted about a common lateral axis between a "stowed" position (shown in FIG. 5c) and a "deployed" position (shown in FIG. 5a). The significance of these positions will be described in greater detail below.

Referring to FIGS. 2 and 5a-5c, hydraulic rams 54 and 56 are mounted to the underside of the bed 28 in an upwardly-angled orientation with each ram 54 and 56 laterally aligned with the front side 46 and 48 of a corresponding one of the lift wedges 16 and 18. Linear drive shafts 58 and 60 that are preferably formed of steel tubing are coupled to the ram shafts 62 and 64 at one end and engage the front sides 46 and 48 of the lift wedges 16 and 18 at an opposite end. The linear drive shafts 58 and 60 preferably extend through positioning cuffs 66 and 68 that are rigidly mounted to the underside of the bed 28 and the cuffs 66 and 68 have interior dimensions that are slightly larger than the exterior dimensions of the linear drive shafts 58 and 60. The positioning cuffs 66 and 68 thereby secure the vertical and lateral positions of the linear drive shafts 58 and 60 while allowing the linear drive shafts 58 and 60 to slide longitudinally through the cuffs 66 and 68.

Figure 5A:
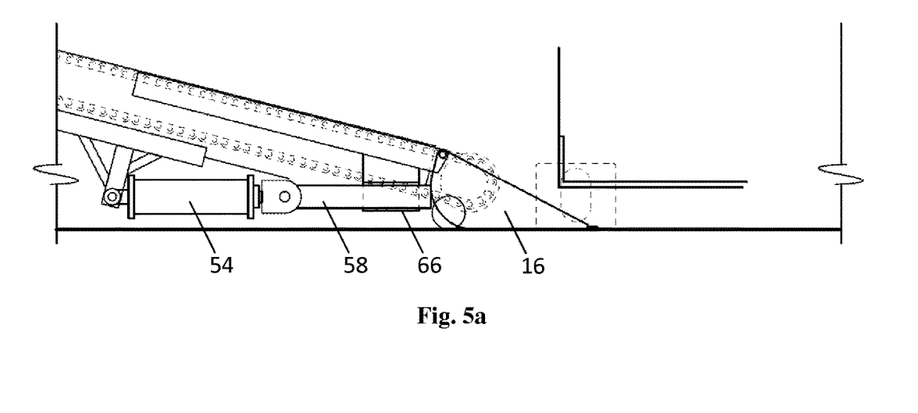
FIGS. 5a-5c are a series of side elevation views illustrating the operation of the lift wedges of the preferred embodiment of the present invention shown in FIG. 1.
Figure 5B:
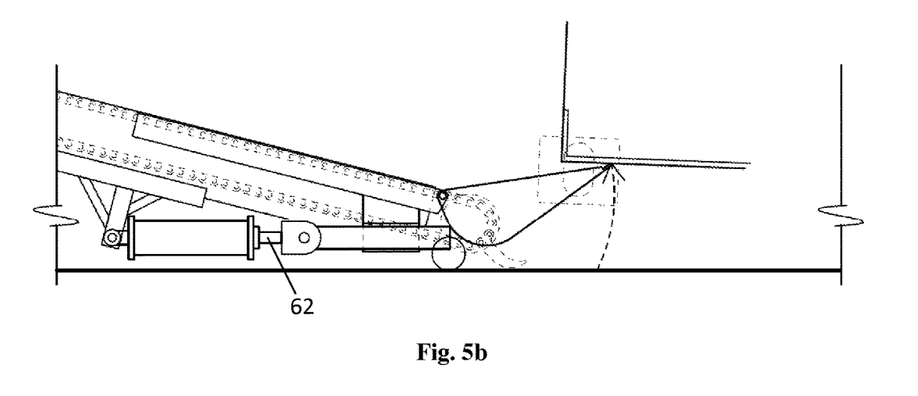
Figure 5C:
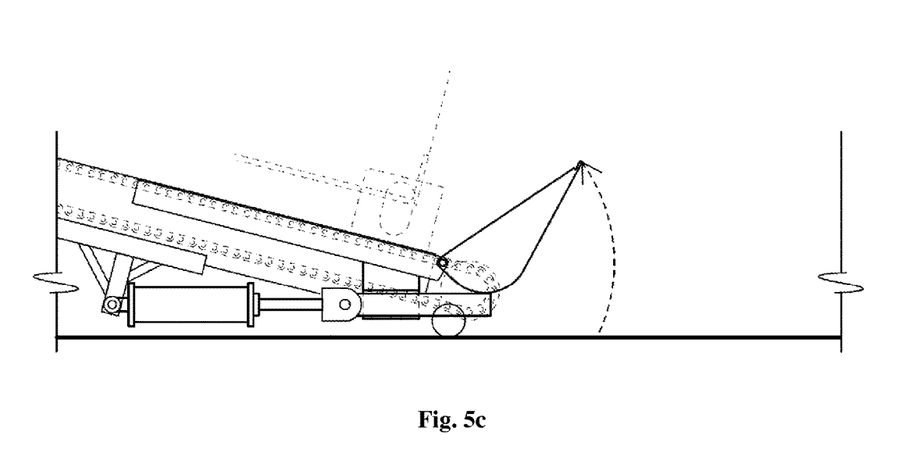

When the ram shafts 62 and 64 are extended from their fully retracted positions to their fully extended positions, the attached linear drive shafts 58 and 60 are shifted rearwardly, against the rounded, front sides 46 and 48 of the lift wedges 16 and 18. The lift wedges 16 and 18 are thereby forced to rotate upwardly, about their respective pivot pins, to their stowed positions as shown in FIG. 5c. When the ram shafts 62 and 64 are retracted from their fully extended positions to their fully retracted positions, the attached linear drive shafts 58 and 60 are drawn forward, thereby allowing the lift wedges 16 and 18 to rotate downwardly, about their respective pivot pins, to their deployed positions as shown in FIGS. 1 and 5a.

The hydraulic rams 54 and 56 are preferably operatively coupled to a control mechanism (not shown) that is located in the truck cab for allowing an operator to control the operation of the rams 54 and 56 while seated in the cab. Alternatively, it is contemplated that the control mechanism can be located on the bed 28 or on a remote controller. It is further contemplated that pneumatic rams, linear actuators, or other suitable drive means can be substituted for the hydraulic rams 54 and 56 without departing from the present invention.

Referring to FIG. 1, a pair of buffer wheels 166 and 168 is rotatably mounted to the rear edge of the bed 28, inward of the lift wedges 16 and 18. The buffer wheels 166 and 168 are formed of steel, although it is contemplated that the buffer wheels 166 and 168 can be formed of any other suitably durable material, including, but not limited to, various other metals, hardened rubber or plastics, or various composites. When the bed 28 is deployed during operation of the apparatus 10 (as will be described below) the buffer wheels 166 and 168 engage the surface upon which the truck and container sit and prevent the rear edge of the bed 28 from scraping and potentially damaging the surface. It is contemplated that a greater or fewer number of buffer wheels 166 and 168 can alternatively be employed, or that the buffer wheels 166 and 168 can be entirely omitted.

Referring to FIG. 1, the container locking assemblies 20-26 are located adjacent the four corners of the bed 28. The locking assemblies 20-26 are substantially identical and will therefore be described with reference to the locking assembly 20 only. It will be understood that such description shall extend to each of the other locking assemblies 22-26 with necessary consideration given to differences in their respective positions and orientations.

Figure 2:
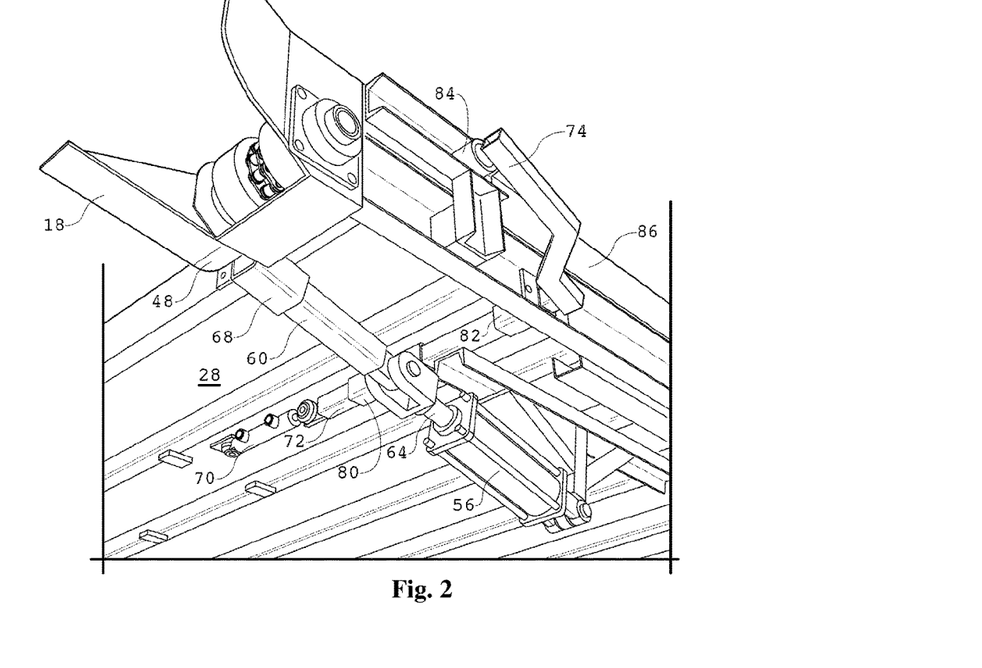
FIG. 2 is a bottom perspective detail view illustrating several components of the preferred embodiment of the present invention shown in FIG. 1.
Figure 4:
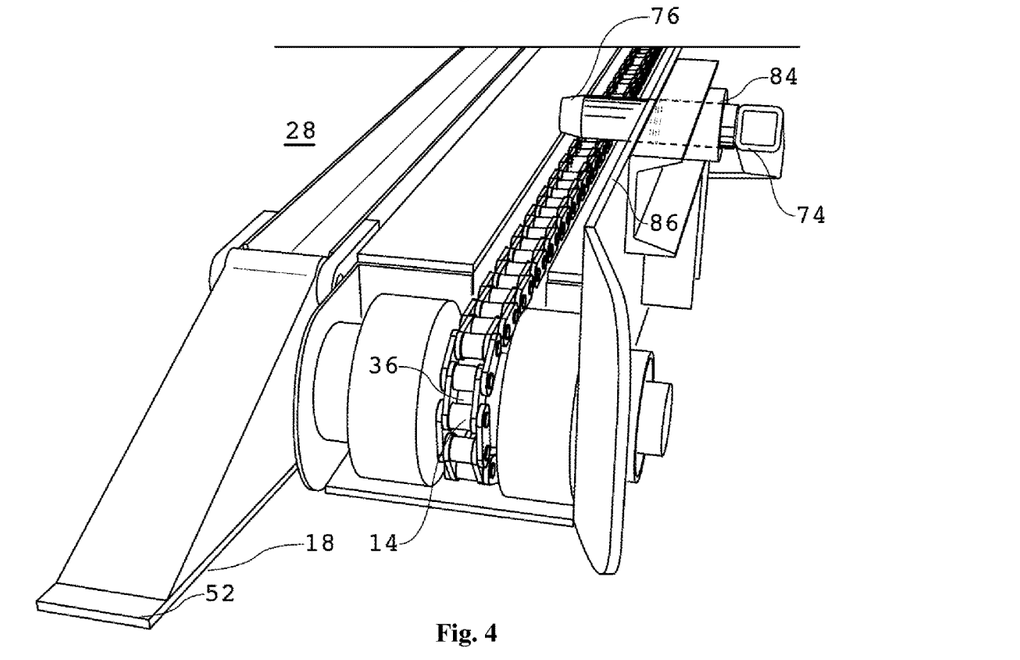
FIG. 4 is a top perspective detail view illustrating several components of the preferred embodiment of the present invention shown in FIG. 1 with the locking pin 76 in a locked position.

Referring to FIGS. 2 and 4, the locking assembly 20 includes a hydraulic ram 70, a linear drive shaft 72, a coupling bracket 74, and a locking pin 76. The hydraulic ram 70 is rigidly mounted to the underside of the bed 28 in a laterally extending orientation with the ram shaft directed outwardly. The linear drive shaft 72 is an elongated member that is preferably formed of steel tubing and is coupled to the ram shaft at one end and extends laterally outwardly to the edge of the bed 28. The linear drive shaft 72 preferably extends through positioning cuffs 80 and 82 that are rigidly mounted to the underside of the bed 28 and have interior dimensions that are slightly larger than the exterior dimensions of the linear drive shaft 72. The positioning cuffs 80 and 82 thereby secure the vertical and longitudinal position of the linear drive shaft 72 while allowing the linear drive shaft 72 to slide laterally through the cuffs 80 and 82.

The coupling bracket 74 is an elongated member that is preferably formed of steel tubing and is rigidly mounted at one end to the outer end of the linear drive shaft 72, preferably by welds. The coupling bracket 74 extends upward and outward from the linear drive shaft 72 to a second end that is positioned outside of the drive chain 14 and above the top surface of the bed 28. The locking pin 76 is a substantially cylindrical member, preferably formed of steel, that is rigidly mounted at one end to the second end of the coupling bracket 74, preferably by welds, and extends laterally inwardly therefrom. The locking pin 76 preferably extends through a tubular positioning cuff 84 that is mounted to a sidewall 86 of the bed 28 and provides a passageway therethrough. The positioning cuff 84 has interior dimensions that are slightly larger than the exterior dimensions of the locking pin 76. The positioning cuff 84 thereby secures the vertical and longitudinal position of the locking pin 76 while allowing the locking pin 76 to slide laterally through the cuff 84.

Figure 3:
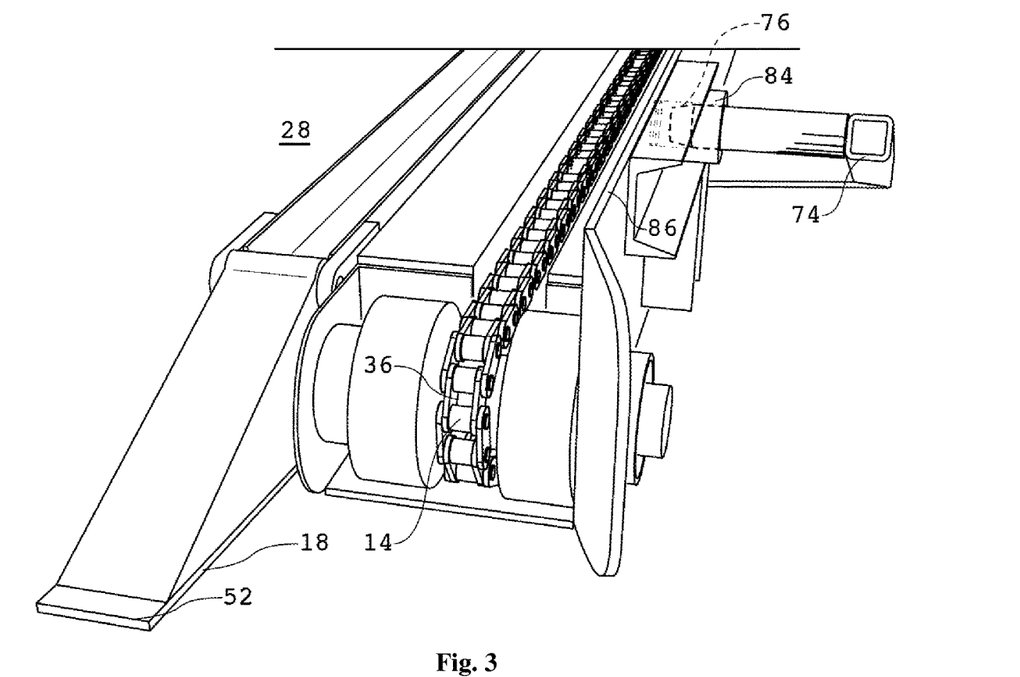
FIG. 3 is a top perspective detail view illustrating several components of the preferred embodiment of the present invention shown in FIG. 1 with the locking pin 76 in an unlocked position.

Configured in the manner described 28 above, the linear drive shaft 72, coupling bracket 74, and locking pin 76 form a unitary body that can be shifted laterally inwardly and outwardly through operation of the hydraulic ram 70. Thus, when the ram is in its fully extended position, the locking pin 76 is in a laterally-outermost "unlocked" position (as shown in FIG. 3), wherein the locking pin 76 does not protrude, or protrudes insubstantially, inward from the sidewall 86 of the bed 28. Conversely, when the ram is in its fully retracted position, the locking pin 76 is in a laterally-innermost "locked" position (as shown in FIG. 4), wherein the locking pin 76 protrudes several inches inward from the sidewall 86 of the bed 28.

The hydraulic ram 70 is operatively coupled to a control mechanism (not shown) that is preferably located in the truck cab for allowing an operator to control the operation of the locking assembly 20 while seated in the cab. Alternatively, it is contemplated that the control mechanism can be located on the bed 28 or on a remote controller. It is further contemplated that a pneumatic ram, linear actuator, or other suitable drive means can be substituted for the hydraulic ram 70 without departing from the present invention.

While it is preferred that the linear drive shaft 72 and coupling bracket 74 be formed of steel tubing and that the locking pin 76 be formed of a steel cylinder, it is contemplated that these components can be formed of any suitably shaped structures, including, but not limited to, various different type of plates, pipes, tubes, bars, and brackets formed of any suitably rigid and durable material, including, but not limited to various different metals, plastics, and composites. It is further contemplated that the linear drive shaft 72, coupling bracket 74, and locking pin 76 can be formed of a single, contiguous piece of material instead of separate pieces of material that are affixed to one another in the manner described above.

Referring to FIGS. 5a-5c, 6a-6c, 7a-7d and 8a-8d, several series of views depicting the typical operation of the apparatus 10 for loading an ISO container 100 onto the bed 28 of a truck 102 are shown. Referring to FIG. 7a, the truck 102 and bed 28 are shown in an initial position and configuration immediately prior to the commencement of loading the container 100. Particularly, the truck 102 has been backed up to a position in front of the container 100; the bed 28 is in a horizontal, stowed position; the lift spikes 38 and 40 are in their unloaded positions; the lift wedges 16 and 18 are in their deployed positions; and the locking pins 76 are in their locked positions.

Figure 6A:
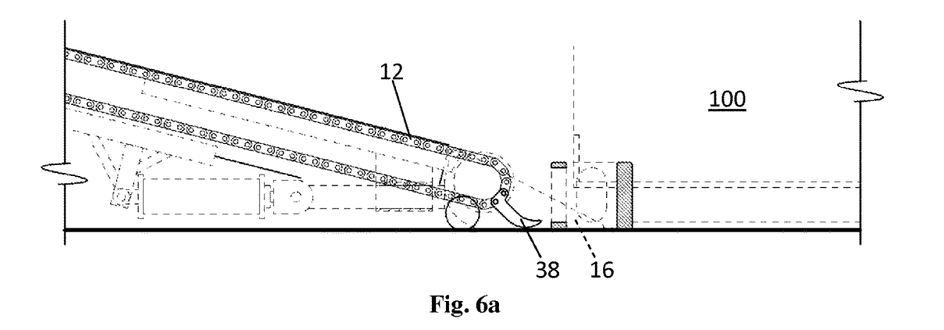
FIGS. 6a-6c are a series of side elevation views illustrating the operation of the lift spikes of the preferred embodiment of the present invention shown in FIG. 1.
Figure 6B:
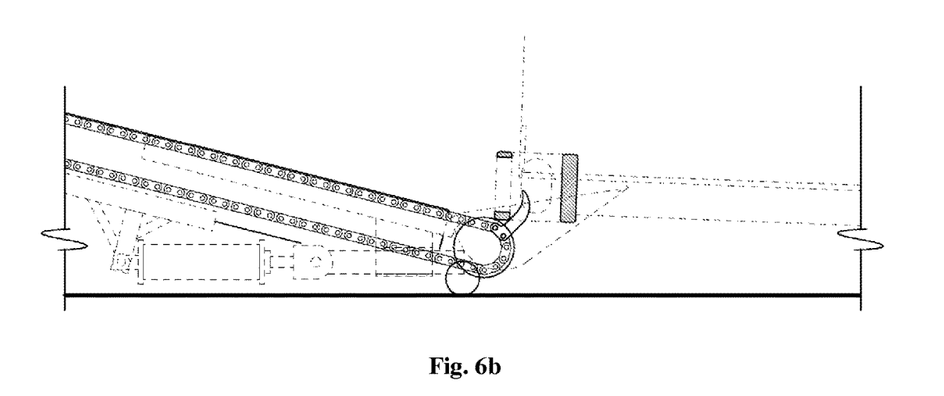
Figure 6C:
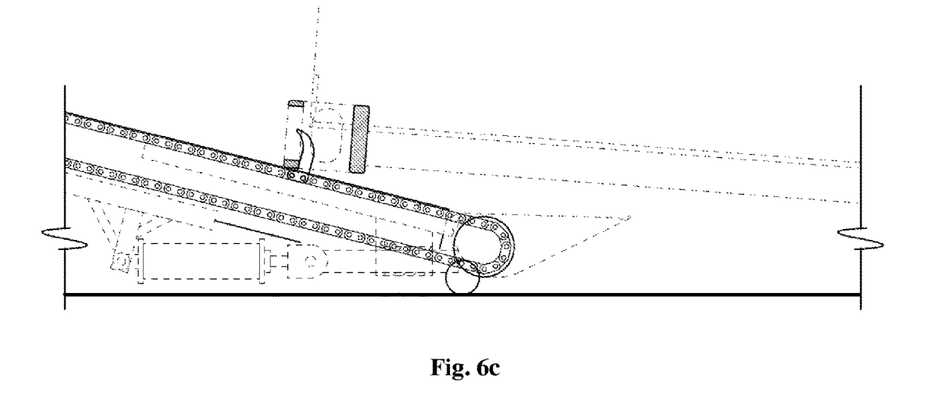
Figure 7A:
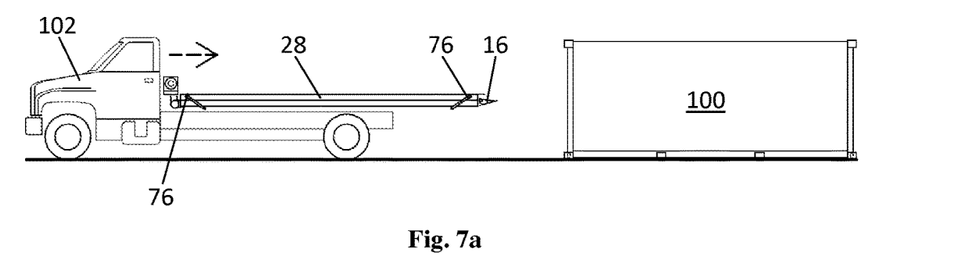
FIGS. 7a-7d are a series of side elevation views illustrating the deployment of the preferred embodiment of the present invention shown in FIG. 1.
Figure 7B:
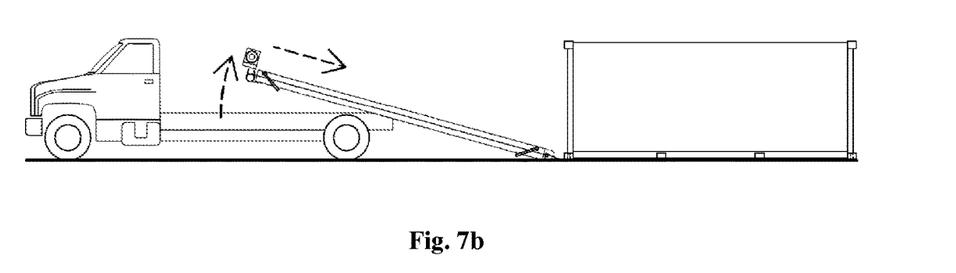
Figure 7C:
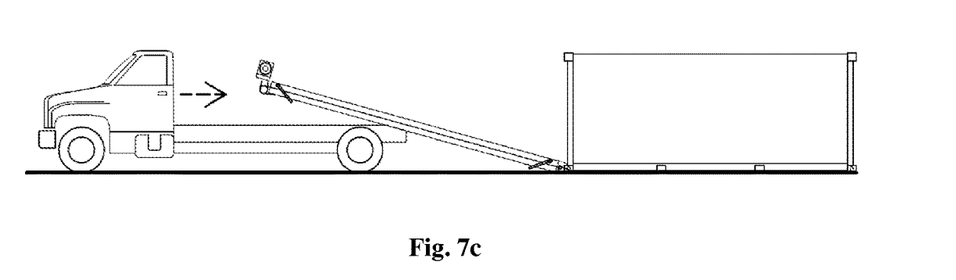
Figure 7D:
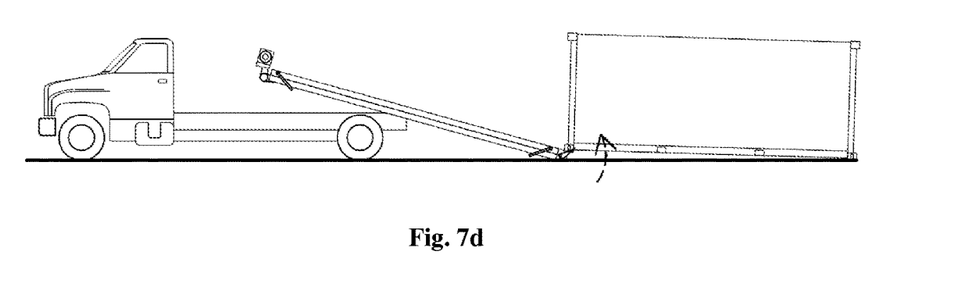

Next, referring to FIG. 7b, the loading operation has commenced, with the locking pins 76 moved to their unlocked positions (i.e. through extension of the hydraulic rams 70, as described above), and the truck bed 28 deployed in a conventional manner (i.e. tilted and lowered, such as through the cooperative operation of a hydraulic lift and a chain drive in the case of a straight truck or by sliding the wheels of the trailer forward in the case of a trailer) until the buffer wheels 166 and 168 (see FIG. 1) and the bottom surfaces of the lift wedges 16 and 18 come to rest on the ground. Referring to FIGS. 5a and 7c, the truck 102 is then backed up until the lift wedges 16 and 18 partially extend below the recessed, forward lift points of the container 100. Referring to FIGS. 5b and 7d, with the truck 102 in neutral gear, the lift wedges 16 and 18 are then rotated upwardly, approximately halfway toward their stowed positions, thereby lifting the front end of the container 100 several inches off of the ground and simultaneously pulling the truck 102 and the bed 28 several inches rearward. The lift wedges 16 and 18 are then rotated back down to their deployed positions, thereby bringing the front corners of the container 100 to rest on the front edge of the bed 28, with each corner positioned atop one of the drive chains 12 and 14, as shown in FIG. 6b.

Figure 8A:
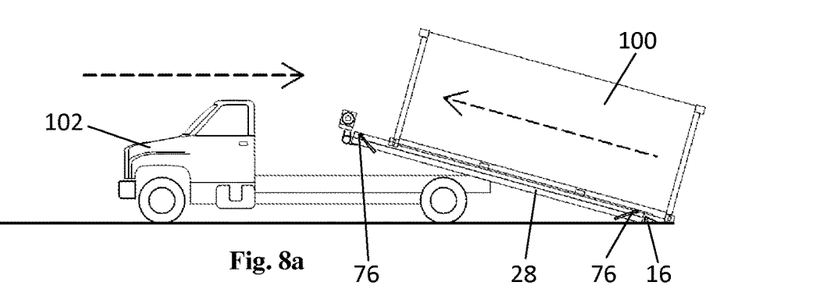
FIGS. 8a-8d are a series of side elevation views illustrating the preferred embodiment of the present invention shown in FIG. 1 being used to load and secure a shipping container on a truck bed.
Figure 8B:
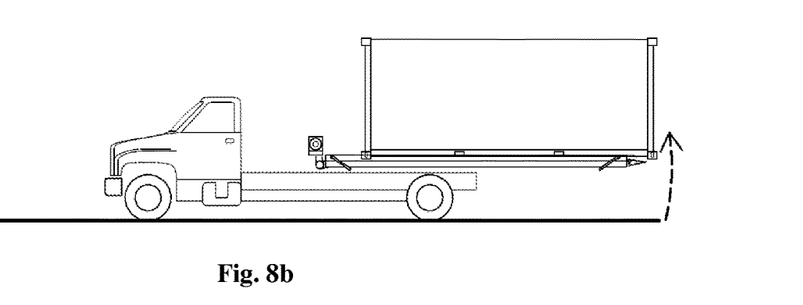
Figure 8C:
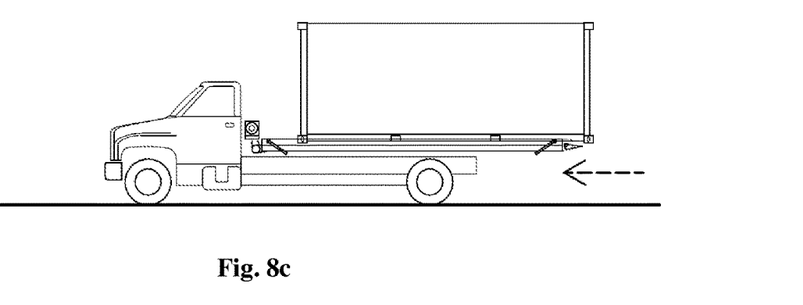
Figure 8D:
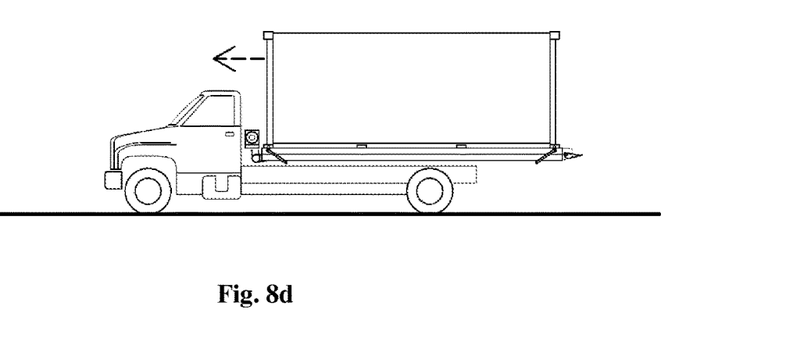

Next, referring to FIG. 6b, the hydraulic motor 42 is activated, thereby driving the drive chains 12 and 14 and rotating the lift spikes 38 and 40 from their unloaded positions upwardly, into engagement with the bottom-front corner holes of the container 100. The hydraulic motor 42 then continues to drive the drive chains 12 and 14 and lift spikes 38 and 40, thereby pulling the truck 102, which is still in neutral gear, toward the container 100 and wedging the bed 28 underneath the container 100 while lifting the container 100 onto the bed 28 as in FIG. 6c. The hydraulic motor 42 is driven until the container 100 is entirely or almost entirely resting on the bed 28, as shown in FIG. 8a. The hydraulic motor 42 is then disengaged and the bed 28 is tilted and retracted back to its stowed, horizontal position, as shown in FIGS. 8b and 8c. The hydraulic motor 42 is then reengaged and the lift spikes 38 and 40 are driven forward to their loaded positions, thereby pulling the container 100 to its final, loaded position on the bed, as shown in FIG. 8d.

With the container 100 loaded onto the bed 28 in the manner described above, the locking pins 76 of the locking assemblies 20-26 are positioned laterally in-line with the laterally outwardly-facing corner holes 106, 108, 110, and 112 of the container 100. The locking pins 76 are then laterally shifted to their locked positions, thereby bringing the locking pins 76 into axial engagement with the corner holes 106-112 of the container 100 and securing the container 100 to the bed 28 for transport. Unloading the container 100 from the bed 28 is generally effectuated by performing the above-described loading steps in reverse.

Figure 9:
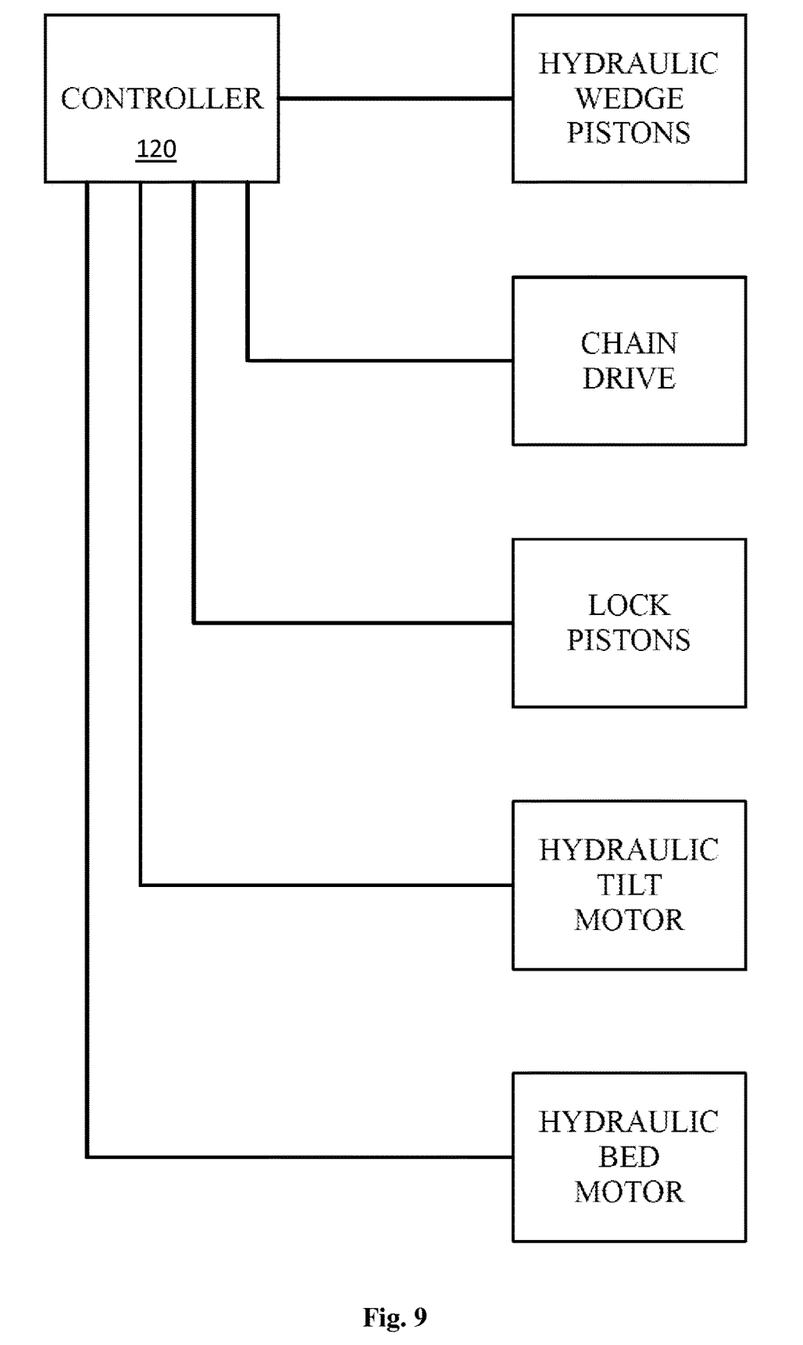
FIG. 9 is a schematic diagram illustrating the operative interconnection of several components of the preferred embodiment of the present invention shown in FIG. 1.

Referring to FIG. 9, the majority of the above-described steps for loading and unloading a container are preferably performed automatically by an appropriately programmed master control unit 120, such as a microcontroller or a programmable logic controller, that is operatively connected to the hydraulic motor 42 and the hydraulic rams 54, 56, and 70. For example, after the operator has deployed the bed 28 and has positioned the truck 102 with the lift wedges 16 and 18 extending partially under the lift points of the container 100, the operator can activate an "auto-load" function by manipulating an operator interface, such as button or a switch, for the master control unit 120. The master control unit 120 then automatically operates the components of the apparatus 10 in accordance with the above-described loading sequence without requiring any further input from the operator and without requiring the operator to be seated in the cab of the truck 102. An "auto-unload" function is effectuated in a similar manner. It is contemplated that the operator interface for the master control unit 120 can be located in the truck cab, on the bed 28, or at both locations.

When the apparatus 10 is not being used to load, unload, or secure a container in the manner described above, it is contemplated that a tow bar can be mounted to the lift spikes 38 and 40 and used in a conventional manner to tow items on or behind the bed. The tow bar can be a conventional, commercially available tow bar that fits, or is modified to fit, the lift spikes 38 and 40 of the apparatus, or can be a custom built tow bar that is designed to accommodate the lift spikes 38 and 40.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for loading a container onto a substantially upwardly-facing bed, the container having sidewalls that mount at lower sidewall ends to a floor, the floor having a downwardly-facing surface that faces an upwardly-facing surface upon which the container rests, the container having first and second openings that face substantially downwardly when the container is in an operable orientation, the first and second openings formed in at least respective first and second corners on an end of the container, the method comprising:

a) disposing a rear edge of the bed adjacent a substantially upwardly-facing surface upon which the container sits in an operable orientation;

b) disposing at least one lift wedge extending from the rear edge of the bed under the end of the container between the upwardly-facing surface and the downwardly-facing surface of the floor;

c) raising said at least one lift wedge substantially upwardly to a stowed position, thereby lifting the end of the container above the rear edge of the bed;

d) operatively linking a drive mechanism to at least one of the first and second corners while the end of the container is above the rear edge of the bed;

e) lowering said at least one lift wedge to a deployed position while the drive mechanism is operatively linked to said at least one of the first and second corners; and f) operating said drive mechanism in a first direction, thereby pulling the end of the container towards a front of the bed.

2. The method in accordance with claim 1, further comprising the step of operating the drive mechanism in a second, opposite direction, thereby pushing the container off of the bed.

3. The method in accordance with claim 1, further comprising shifting at least one locking pin that is movably mounted to the bed into a corner hole of the container to secure the container to the bed.

4. A combination of a container having upright sidewalls connected by a floor and a lifting apparatus mounted to a substantially upwardly-facing bed having a rear edge, the combination comprising:

a) at least one lift wedge pivotably mounted to, and protruding rearwardly from, the rear edge of the bed, said at least one lift wedge disposed into a first void between a substantially upwardly-facing surface upon which the container sits and a front end of the container, and laterally between the container sidewalls; and b) a drive mechanism operatively coupled to said at least one lift wedge and configured to pivot said at least one lift wedge upwardly, whereby said at least one lift wedge pivots upwardly and raises the front end of the container above the rear edge of the bed;

wherein the container has first and second openings that face substantially downwardly when the container is in an operable orientation, the first and second openings formed in at least respective first and second corners on the front end of the container, further comprising a second lift wedge moveably mounted to, and protruding rearwardly from, the rear edge of the bed, said second lift wedge spaced from said at least one lift wedge and disposed into a second void between a substantially upwardly-facing surface upon which the container sits and the front end of the container, wherein the first and second voids are between the first and second corners of the container.

5. The combination in accordance with claim 4, wherein the first and second voids are recessed lift points of the container.

* * * * *

UNITED STATES PATENT AND TRADEMARK OFFICE
CERTIFICATE OF CORRECTION

PATENT NO. : 9,969,314 B2
APPLICATION NO. : 14/471641
DATED : May 15, 2018
INVENTOR(S) : Sean Jones Page 1 of 1

It is certified that error appears in the above-identified patent and that said Letters Patent is hereby corrected as shown below:

On the Title Page

Item (63), please insert:
--Related U.S. Application Data
Continuation of application No. 13/314,317, filed on Dec. 8, 2011, now Pat. No. 8,870,517.--

Signed and Sealed this
Eighth Day of January, 2019

Andrei Iancu
*Director of the United States Patent and Trademark Office*